United States Patent [19]
Rickey et al.

[11] Patent Number: 5,341,808
[45] Date of Patent: Aug. 30, 1994

[54] DOPPLER ULTRASOUND CLUTTER AND SENSITIVITY PHANTOM

[75] Inventors: Daniel W. Rickey; Aaron Fenster, both of London, Canada

[73] Assignee: University Hospital (London) Development Corporation, Ontario, Canada

[21] Appl. No.: 67,995

[22] Filed: May 27, 1993

[51] Int. Cl.$^5$ ............................................. A61B 8/00
[52] U.S. Cl. ................................................ 128/660.01
[58] Field of Search ................... 128/660.01, 660.05, 128/660.03, 661.09; 73/861.25, 644, 605, 599, 602, 630, 646

[56] References Cited

U.S. PATENT DOCUMENTS

| | | | |
|---|---|---|---|
| 3,879,989 | 4/1975 | Brenden | 73/605 |
| 4,783,997 | 11/1988 | Lynnworth | 73/644 |
| 5,027,722 | 12/1991 | Granz | 128/660.03 |
| 5,072,734 | 12/1991 | Takeuchi | 128/660.05 |

OTHER PUBLICATIONS

Richard S. C. Cobbold, Influence of Beam Profile and Degree of Insonation on the CW Doppler Ultrasound Spectrum etc., 1983, 364–70.
Robert W. Gill, Measurement of Blood Flow by Ultrasound: Accuracy and Sound Sources of Error, 1985, 625–641.
Peter N. Burns, Quantitative Flow Measurements with Doppler Ultrasound: Techniques, Accuracy, and Limitations, 1985, 641–657.
Chihiro Kasai, Read-Time Two-Dimensional Blood Flow Imaging Using an Autocorrelation Technique, 1985, 458–463.
W. N. McDicken, A versatile Test-Object for the Calibration of Ultrasonic Doppler Flow Instruments, 1986, 245–249.
Evan J. Boote, Performance Tests of Doppler Ultrasound Equipment with A Tissue and Blood-Mimicking Phantom, 1988, 137–147.
J. C. Wellemetz, Bias and Variance in the Estimate of the Doppler Frequency Induced by a Wall Motion Filter, 1989, 215–225.
D. W. Rickey, A velocity Evaluation Phantom for Colour and Pulsed Doppler Instruments, 1992, 479–494.
A. P. G. Hoeks, An Efficient Algorithm to Remove Low Frequency Doppler Signals in Digital Doppler Systems, 1991, 135–144.
D. W. Holdsworth, Computer-controlled Positive Displacement Pump for Physiological Flow Simulation, 1991, 565–570.
Roy B. Peterson, A Comparison of IIR Initialization Techniques for Improved Color Doppler Wall Filter Performance, 1993.

*Primary Examiner*—William E. Kamm
*Assistant Examiner*—George Manuel
*Attorney, Agent, or Firm*—Webb Ziesenheim Bruening Logsdon Ofkin & Hanson

[57] ABSTRACT

A clutter and sensitivity phantom for calibrating an acoustic beam generating clinical Doppler ultrasound instrument, comprising: a fluid-filled tank into which the ultrasound instrument probe is immersed; first and second sound scattering belts; an acoustic beam splitter intermediate the ultrasound probe and the first and second sound scattering belts, the acoustic beam splitter being oriented at a predetermined angle relative to the ultrasound instrument and to respective ones of the first and second signal scattering belts for splitting and directing the acoustic beam generated by the ultrasound instrument so as to be reflected off both of the first and second sound scattering belts at an identical angle, whereby portions of the acoustic beam reflected off of the first and second sound scattering belts may be separately or simultaneously monitored.

16 Claims, 4 Drawing Sheets

DOPPLER ULTRASOUND CLUTTER AND SENSITIVITY PHANTOM

FIELD OF THE INVENTION

This invention relates in general to ultrasound instruments, and more particularly to a clutter and sensitivity phantom for calibrating an acoustic beam generating Doppler ultrasound device.

BACKGROUND OF THE INVENTION

Medical ultrasound equipment is well known for monitoring human blood flow during diagnosis and surgery. The development of calibration and quality assurance instrumentation has progressed concurrently with advances in medical ultrasound technology. In operation, medical ultrasound instruments have been used to extract the Doppler shift from returned echo signals reflected off of blood cells, and thereby provide information concerning blood flow.

Presently, there are two common implementations of Doppler ultrasound instruments: spectral Doppler instruments, and colour Doppler instruments. Both implementations are fundamentally the same in that they compute the Doppler shift from echo signals reflected from cells containing moving blood. The relationship between the velocity of blood and the Doppler shift is as follows:

$$V = \frac{f \cdot c}{F_0 \cdot 2 \cdot \cos(\theta)} \text{ or } f = \frac{v \cdot F_0 \cdot 2 \cdot \cos(\theta)}{c}$$

where:
V = blood velocity
f = Doppler shift frequency
c = speed of sound
$F_0$ = transmit frequency
$\theta$ = Doppler angle A sound wave is transmitted with a centre frequency of $F_0$. Sound is reflected from moving scatterers (i.e., blood vessels) and detected with a frequency of $F_0 \pm f$, where f is the Doppler shifted signal. The sign of "f" depends on the direction of the moving blood with respect to the ultrasound probe and is positive for a motion towards the transducer, and is negative for motion away from the transducer.

The Doppler angle is the angle between the ultrasonic beam and the direction of blood flow. Obtaining the blood velocity from the received Doppler signal requires the Doppler angle $\theta$ to be estimated from the B-mode image. B-mode, or brightness-mode ultrasound, is a technique for making non-invasive, two-dimensional cross-sectional images of the human body. A pulse (short burst) of sound having a frequency between 2 MHz and 10 MHz is transmitted into the body and the echoes reflected back from acoustic impedance differences are detected. These impedance differences normally correspond to tissue interfaces, e.g., interface between muscle and fat. The returned signal is amplified, often by a logarithmic amplifier, and its envelope is extracted. The amplitude of the received envelope is used to modulate the brightness of the image on a two-dimensional display. An entire image line is acquired with one sound pulse, although instruments equipped with annular or linear arrays may use several pulses of varying focal depths to improve image resolution. Successive image lines are formed by changing the direction of the ultrasound beam, either mechanically or electronically, and repeating the transmit and receive processes. This continues until a complete image, comprised of about 100 lines, is formed. Images are normally acquired continuously and displayed in real time. Typical values of the transmit frequency and Doppler angle are 5 MHz and 60°, respectively. By convention, the speed of sound is assumed to be $1.54 \times 10^5$ cm/s. Blood velocities of 10 to 100 cm/s result in Doppler shift frequencies in the range of 300 to 3000 Hz, which are in the audible range.

Pulsed Doppler instruments have been used to determine the velocity of blood in a small, well defined sample volume. These instruments operate by transmitting a pulse, typically 2 to 40 wavelengths duration, and subsequently receiving echo signals with the same transducer. The received signals are gated so that only those echo signals originating from a single time window (sample volume), corresponding to a known distance from the transducer, are acquired. Each pulse gives the phase of the Doppler signal at one point in time. This requires that many pulses must be used to construct the Doppler signal. All of the echo signals from one pulse must be received before another pulse can be transmitted. Thus, the maximum rate at which pulses are transmitted (pulse repetition frequency—PRF) is determined by the maximum depth that is interrogated. Because pulsed Doppler systems sample velocity discretely, only measured Doppler shift frequency signals below a predetermined frequency may be detected. Above this frequency, which is equal to one half of the pulse repetition rate, the Doppler measurements are aliased, (i.e. fast blood flow appears as if it is moving in the opposite direction).

Essentially all modern pulsed instruments employ a Fourier spectrum analyzer to obtain quantitative information from the Doppler signal. The analyzer performs a Fast Fourier Transform (FFT) approximately every 5 to 20 ms, and displays the resulting power spectrum as an image with time along the horizontal axis, frequency along the vertical axis, and signal power as brightness. Since the sample volume does not move in space, each FFT can contain an ensemble of between 32 and 256 samples. Both forward and reverse velocity components are displayed. The shape of the waveform, as displayed on the spectrum analyzer, can provide diagnostic data concerning disease states. In addition, clinical instruments present the Doppler signal audibly, often in stereo with the forward and reverse Doppler components played through separate audio channels.

colour Doppler instrumentation differs from spectral Doppler systems mainly in the way in which the velocity measurements are presented to the operator. The average velocities in a large number of sample volumes (e.g., 2000) are measured in a two-dimensional plane and are displayed as colours overlaid on the greyscale (B-mode) image. Positive frequency shifts, caused by blood moving toward the transducer, are often coded as red, and negative shifts are often codes as blue. A colour bar defines the way in which the measured velocities are mapped to colours. In addition, some instruments allow other quantities, such as the variance in the velocity measurements, to be displayed as colours (see Kasia et al., "Real-Time Two-Dimensional Blood Flow Imaging Using An Autocorrelation Technique", IEEE Transactions, Sonics and Ultrasonics, su-32:458–463; 1985). The velocity image is updated several times per second, and thus provides a real time visual display of the velocity patterns presented within a vessel.

Colour Doppler instruments typically sample one image at a time with an ensemble of 7 to 16 sound pulses. The short ensemble length and large number of calculations necessitate a fast and accurate frequency estimator such as the autocorrelation technique described by Kasia et al (infra.). The use of a greater number of pulses increases the accuracy of the velocity measurements at the expense of a reduced image frame rate. An average velocity is determined for each of the 50 or so sample volumes located along an image line and the resultant velocity measurements are displayed as colours on a monitor. Both the total number of scan lines and the ensemble length are kept small to ensure a useful frame rate, (i.e. on the order of 10 Hz). The small number of scan lines requires the colour image pixel size to be larger than the B-mode pixel size, resulting in a lower displayed resolution.

Blood vessels of interest can range in diameter from approximately 12 mm to less than 1 mm. Although an ultrasound beam is focused, some part of the Doppler sample volume typically lies outside of the blood vessel. This results in the ultrasound instrument receiving a signal from the vessel wall and surrounding tissue (referred to as the clutter component), as well as from the blood flowing in the vessel (referred to as the flow component). The clutter component returned from the wall and tissue has an amplitude that is many times greater than the flow component. Because of respiration and cardiac motion, the tissue and vessel tend to move, although at slower velocities than the flowing blood. The Doppler signal also contains noise produced by the Doppler instrument's electronics. Thus, the Doppler signal is a composite signal composed of a clutter component, a flow component, and a noise component. The flow component tends to have a low amplitude and high frequency, while the clutter component tends to have a large amplitude and low frequency.

In order to ensure clinical efficacy, Doppler instruments must be able to determine the velocity of moving blood accurately in the presence of clutter and noise signal components. According to the prior art, the clutter component is removed from the composite Doppler signal via filtering prior to velocity estimation. If the clutter component is not filtered, the velocity measurement returns the velocity of the moving tissue and not of the moving blood.

Many different filters, which are often referred to as wall filters have been proposed to remove the clutter component of the signal while leaving the flow component intact. Examples of such systems are found in the following references: Hoeks et al, "An efficient algorithm to remove low frequency Doppler signals in digital Doppler systems", Ultrasonic Imaging, 13:135–144, 1991; Willemetz et al, "Bias and variance in the estimate of the Doppler frequency induced by a wall motion filter" Ultrasonic Imaging, 11:215–225; 1989; and Peterson, "A comparison of initialization techniques for improved Color Doppler IIR Filter Performance", Masters Thesis, University of Washington, 1993. It is well known that the design of a wall filter is very important in clinical ultrasound instruments since this filter effectively determines whether blood flow is detected or not, and thus can directly affect the accuracy with which disease is detected. The wall filter can also affect the accuracy and precision of the velocity measurements made by the Doppler ultrasound instrument.

Although many different wall filters have been proposed to remove the clutter component of the Doppler signal while leaving the flow component intact, there exists no method presently to evaluate and quantify the performance of these filters in a controlled laboratory setting.

When a Doppler instrument interrogates the blood vessels, the signals are attenuated by the intervening tissue. To compensate for this attenuation, the amplifier gain is often increased in the Doppler instrument, which results in an increase in the electronic noise component of the Doppler signal. In addition, measuring flow in small blood vessels results in a larger clutter component and a smaller flow component in the Doppler signal. Small vessels may also require a higher gain level setting, and thus result in more electronic noise being present in the Doppler signal than for large blood vessels. The ability of a Doppler instrument to measure the velocity of blood in deep and/or small vessels is often referred to as its sensitivity.

Prior art techniques for quantifying the sensitivity of a Doppler instrument have been based upon the use of angled simulated vessels located within a tissue-mimicking attenuating medium (see Boote et al. "Performance tests of Doppler ultrasound equipment with a tissue and blood-mimicking phantom", Journal of Ultrasound Medicine, 7:137–147, 1988). A Doppler flow signal is generated in this system by pumping blood or a blood-mimicking fluid at known flow rates through the vessel. With this technique, the maximum vessel depth at which a Doppler signal can be detected, is used as a measure of sensitivity. Both the flow component and the clutter component of the signal are attenuated by the tissue mimic, and the electronic noise component is not effected by the tissue mimic.

This technique has a number of shortcomings. Firstly, it does not differentiate the flow component and the clutter component of the Doppler signal. That is, the amplitude of the clutter component cannot be varied independently of the flow component. In addition, there is little or no control over the velocity of the clutter component. Secondly, because the Doppler signal strength is varied by changing the depth of the vessel, other factors such as the ultrasonic beam shape change the ratio of flow to clutter component present in the Doppler signal in a manner which is difficult to predict. Lastly, the flowing blood mimic has a parabolic velocity profile and thus varies as the square of radial position in the simulated vessel. Thus, the flow component of the doppler signal depends in a complicated manner on the Doppler sample volume and its relative orientation within the fluid velocity profile (see Burns and Jaffe, "Quantitative flow measurements with Doppler ultrasound: techniques, accuracy and limitations", Radiologic Clinics of North America, 23:641–657, 1985; and Gill, R. W., "Measurement of blood flow by ultrasound: accuracy and sources of error", Ultrasound in Med. and Biol., 11:625–641, 1985). Although this complicated flow signal may simulate the physiological state, it is very difficult to analyze. Furthermore, the onset of turbulence may prevent assessment of sensitivity at high flow rates (see McDicken, W. N. "A versatile test-object for the calibration of ultrasonic Doppler flow instruments"; Ultrasound In Med. and Biol., 12:245–249, 1986).

SUMMARY OF THE INVENTION

It is an object of an aspect of the present invention to provide a test phantom capable of providing proper evaluation of wall filters and capable of accurately characterizing the sensitivity of the Doppler instrument. Therefore, according to the present invention, a test phantom is provided which allows the relative amplitudes of the flow component, clutter component, and electronic noise present in a Doppler signal to be varied independently. In addition, the test phantom of the present invention is capable of independently varying the velocities of the flow and clutter components.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
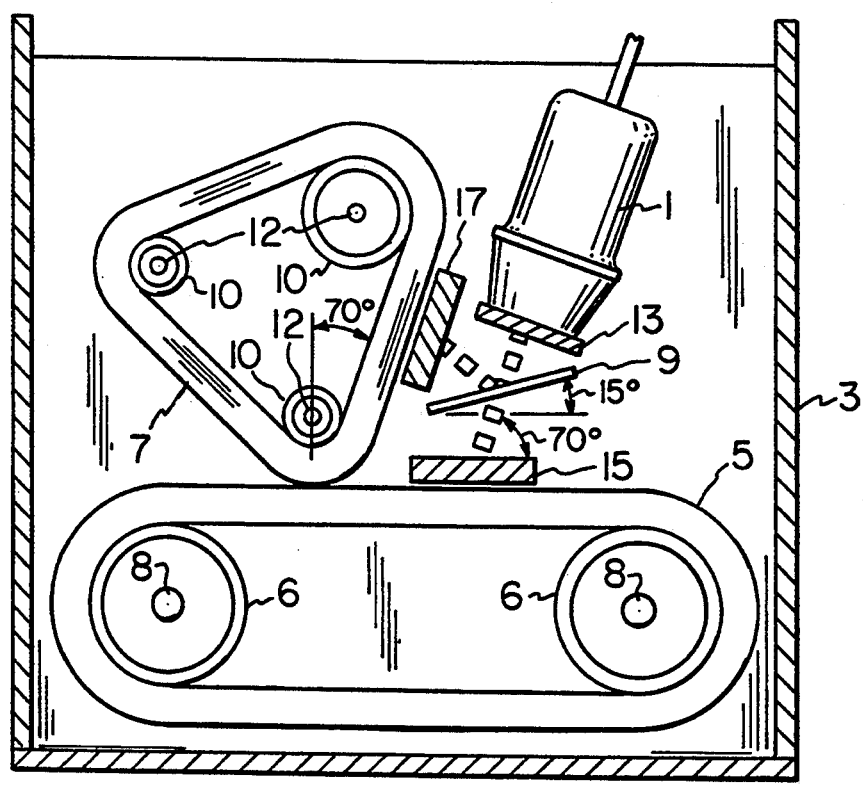
FIG. 1 is a schematic diagram of a clutter and sensitivity test phantom for calibrating an acoustic beam generating clinical Doppler ultrasound instrument according to the present invention.

Turning to FIG. 1, a clutter and sensitivity phantom is shown for calibrating an acoustic beam generating clinical Doppler ultrasound instrument. The ultrasound probe or transducer 1 is immersed in a water-filled tank 3 containing a sound beam scattering clutter belt 5 and a sound beam scattering flow belt 7.

The clutter belt 5 passes over a pair of pulleys 6 which are mounted on stainless steel axle shafts 8. Similarly, flow belt 7 is mounted in a triangular configuration on pulleys 10 which, in turn, are mounted to respective stainless steel axle shafts 12.

Figure 3A:
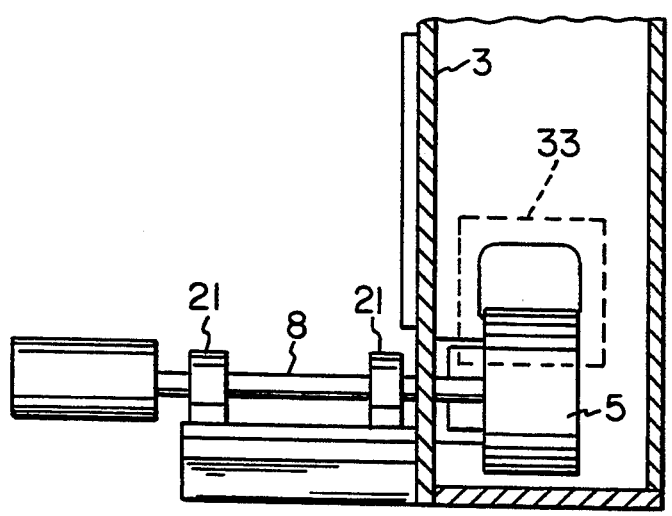
FIGS. 3A and 3B show details of the clutter belt used in the test phantom of FIG. 1.
Figure 3B:
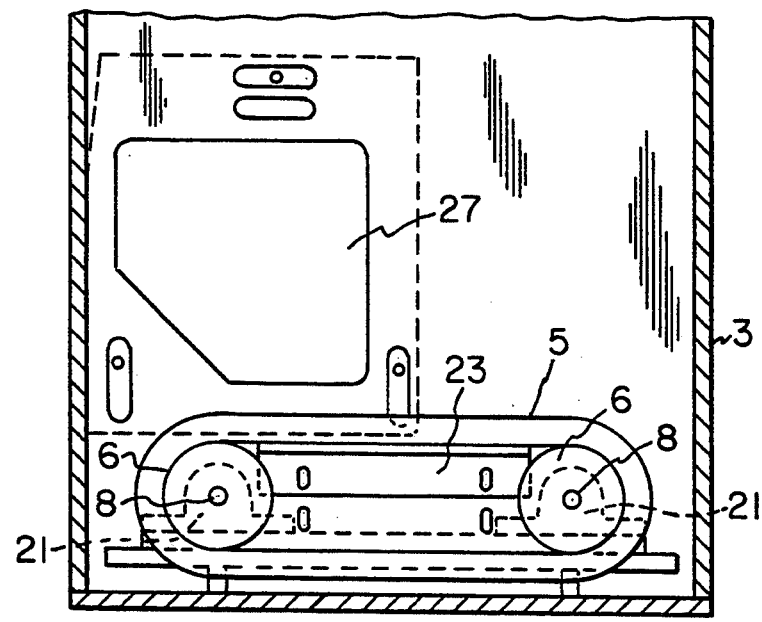
Figure 4:
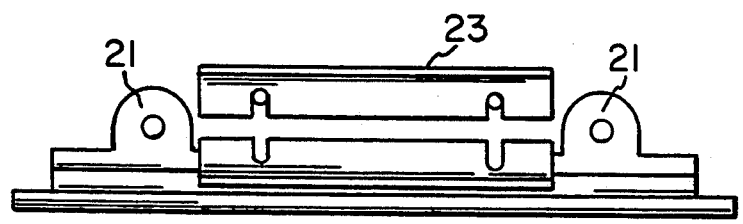
FIG. 4 shows details of a rear mounting plate and location of the clutter belt pillow blocks and belt guides, according to the embodiment illustrated in FIG. 1.

With reference to FIG. 3, the layout of clutter belt 5 is shown in greater detail. Specifically, stainless steel axle shafts 8 are shown mounted in respective pillow blocks 21, and metal guides 23 are located under the belt 5 in order to prevent oscillations. The pillow blocks 21 and metal guides 23 are shown in greater detail with reference to FIG. 4. Furthermore, microstepping motor 25 is shown in the side view of FIG. 3A connected to axle 8.

An acoustic beam splitter 9 is disposed intermediate the ultrasound probe 1 and the clutter and flow belts 5 and 7, respectively so that the acoustic beam 11 generated by ultrasound probe 1 is split and directed so as to be reflected off both of the clutter belt 5 and flow belt 7 which provides a simulation of the clutter component and flow component, respectively, of a returned or echo signal of the ultrasound instrument.

Figure 5A:
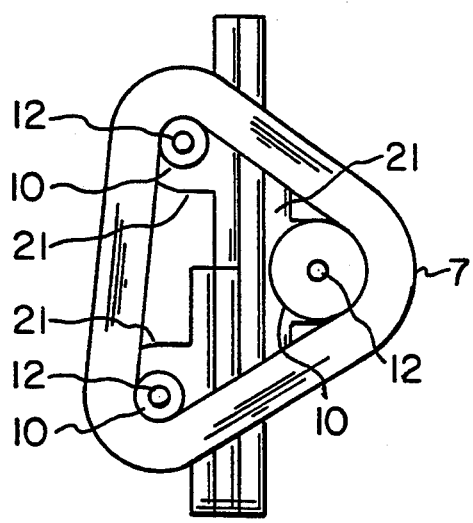
FIGS. 5A, 5B and 5C show construction of the flow belt according to the preferred embodiment of FIG. 1.

Each of the clutter and flow belts is driven by a respective microstepping motor (see FIGS. 3 and 5), which allows the velocity of each belt to be varied from −100 cm/s to +100 cm/s.

The acoustic beam splitter 9 is oriented at a predetermined angle relative to the ultrasound probe 1 and to respective ones of the clutter belt 5 and flow belt 7 to provide the correct Doppler angle for use during calibration. According to the preferred embodiment, acoustic beam splitter 9 consists of a 0.001 cm thick layer of heat-shrink plastic mounted on a rigid frame (not shown).

Attenuators 13, 15 and 17 are located in front of the ultrasound probe 1, clutter belt 5 and flow belt 7, but do not actually touch the belts, thereby providing for independent adjustment of the amplitudes of the clutter, flow and noise components of the Doppler signal during calibration.

In operation, the Doppler probe 1 is placed in the tank 3 facing the beam splitter 9 as shown in FIG. 1. The Doppler angle is determined by the orientation of the probe 1 and the beam splitter 9 with respect to the belts 5 and 7. The clutter and flow belts 5 and 7 are translated at known constant or time-varying velocities by means of the aforementioned microstepping motors. The three attenuators 13, 15 and 17 are chosen so that the desired signal component amplitudes are achieved. In addition, by choosing one of the attenuators to be highly attenuating (e.g. acoustically opaque rubber), a Doppler signal containing no clutter component, no flow component, or electronic noise only, may be obtained. For example, in one test case, attenuator 17 may be made acoustically opaque so that the Doppler signal will contain only clutter and electronic noise components. In another test case, attenuator 15 may be made acoustically opaque so that the Doppler signal contains only flow and electronic noise components. Finally, in a third case, the attenuator 13 may be made acoustically opaque so that the Doppler signal will contain only electronic noise components.

Figure 2:
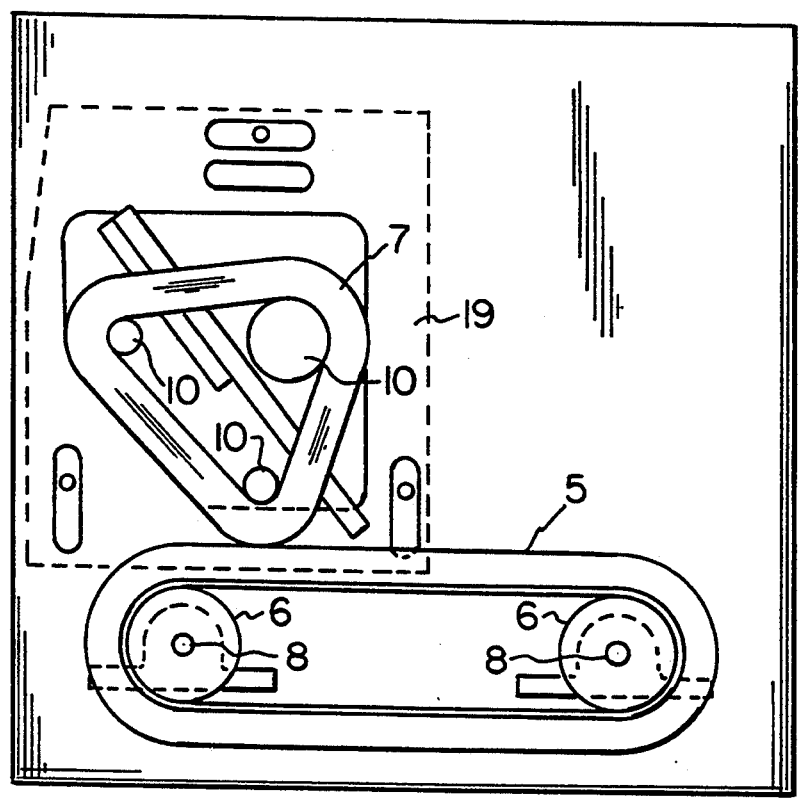
FIG. 2 is a diagram showing the orientation of the clutter and flow simulating belts used in the test phantom of FIG. 1.

According to the preferred embodiment, each of the belts 5 and 7 is approximately 7.6 cm in width and is fabricated from rubber. The scattering material for belts 5 and 7 preferably comprises a 2 cm thick layer of open cell foam having a fibre diameter and cell size of approximately 0.002 cm and 0.05 cm, respectively. This material has been found to provide a strong backscattered signal. Orientation of the belts 5 and 7 is shown in greater detail with reference to FIG. 2, the acoustic beam splitter 9 and attenuators 13, 15 and 17 being omitted for clarity.

Figure 5B:
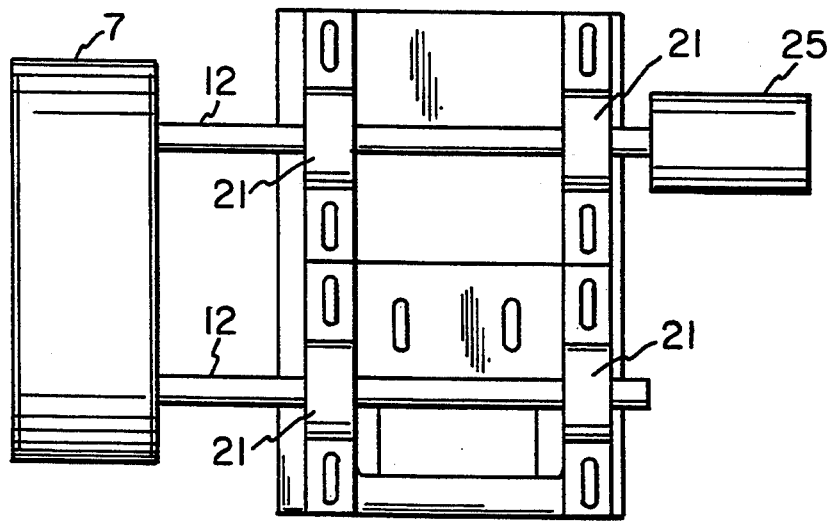
Figure 5C:
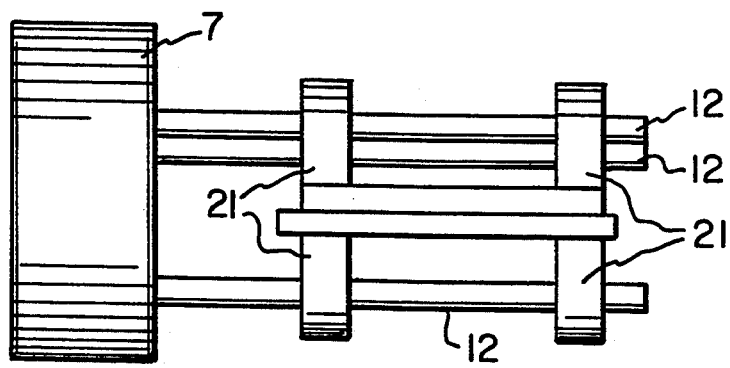

As shown in FIG. 3A, as well as in FIG. 5B, the stainless steel axle shafts 8 and 12 pass through a Neoprene TM lip seal in the rear wall of tank 3 and into ball bearing mounts forming part of the microstepping motors 25. More particularly, one each of axle shaft 8 and 12 is connected to a reduction gear box, (i.e. two gear boxes such as Renold jPM), which is driven by the microstepping motors 25 (e.g. Compumotor DB series) via a flexible shaft coupler (not shown). By providing separate motor drives for the clutter belt 5 and flow belt 7, the belts may be controlled to run at different velocities.

Figure 6:
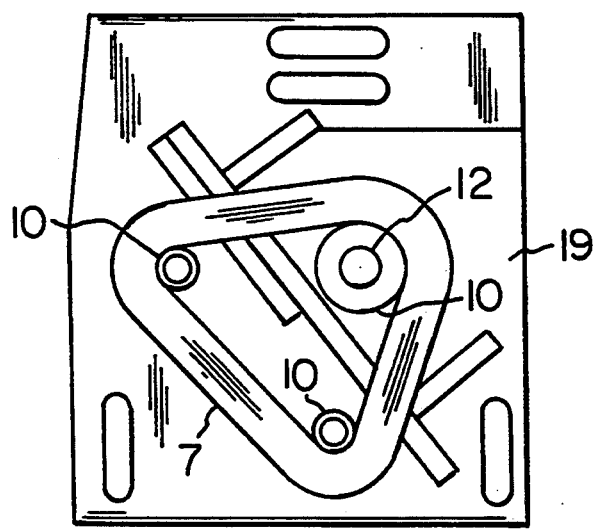
FIG. 6 shows details of the flow belt and its mounting plate according to the preferred embodiment of FIG. 1.

In order to allow for different angles between the flow and clutter belts 7 and 5, the flow belt assembly is mounted on a rotatable plate 19, as shown best with reference to FIG. 6.

Alternative embodiments and variations of the present invention are contemplated. For example, in addition to the distilled water contained within tank 3, approximately 6% Glycerol may be added in order to increase the speed of sound within tank 3 to that of human tissue. In addition, a small amount of surfactant (e.g. Photo-flo 200, Kodak Canada, Toronto), may be added to prevent bubbles from being trapped within the foam scattering material of belts 5 and 7.

Figure 7:
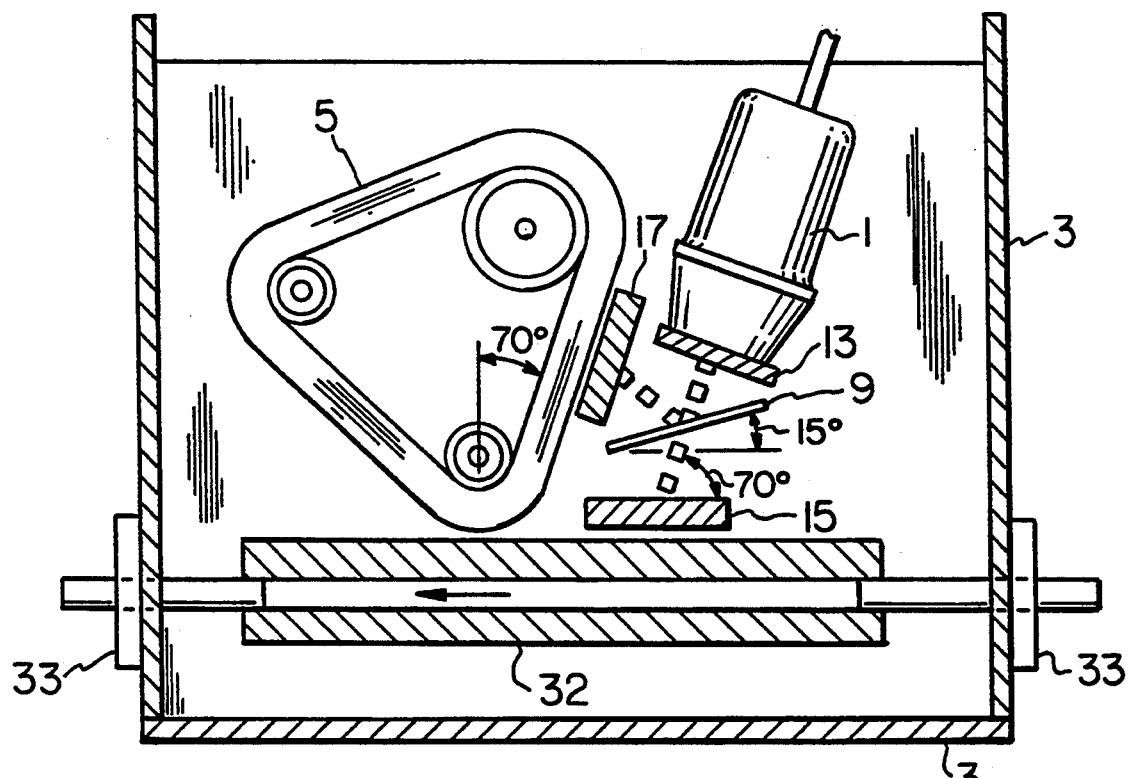
FIG. 7 shows an alternative embodiment of the invention, in which the flow component is supplied by fluid flowing through a simulated vessel.

One alternative embodiment of the invention is shown in FIG. 7 in which the flow belt is replaced by fluid flowing through a simulated vessel 32, while the clutter belt 5 is made triangular and positioned similarly to the flow belt 7 in FIG. 1. Mounting plates 33 are provided in the side of tank 3 to allow fluid connections to be made from the vessel 32 to an external flow source, such as a computer-controlled pump. The simulated vessel 32 can be made so that the clutter component produced by the vessel and surrounding material is extremely small.

Other alternative embodiments are contemplated as follows: the open cell foam used as scattering material for belts 5 and 7 may be replaced with other suitable material such as a solid agar-based gel, or tissue such as meat (with the tank water replaced by saline). Any other type of motor and gear box combination may be utilized other than the microstepping motor 25, provided that the resultant belt velocities are sufficiently accurate and precise. The beam splitter 9 may be fabricated from any suitable material provided that no artifacts are introduced by such a substitute material into the Doppler signal. By replacing the acoustic beam splitter 9 with an optical beam splitter, the phantom according to the present invention may be used to evaluate laser Doppler instruments. Finally, the phantom of the present invention may be used to evaluate Doppler ultrasound systems that are used in industry application rather than in clinical settings (e.g., for measuring fluid flow in a tube or pipe). Also, the phantom of the present invention may use a different number of pulleys for carrying the various belts. For example, the flow belt 7 can be constructed with only two pulleys, and the clutter belt 5 may be constructed with three or more pulleys.

All such modifications and alternative embodiments are believed to be within the sphere and scope of the present invention as defined by the claims appended hereto.

We claim:

1. Apparatus for generating beams for calibrating a clinical Doppler instrument having a probe generating a beam, said apparatus comprising:
    (a) a fluid-filled tank into which said probe is immersed;
    (b) a first beam scattering means positioned in said tank;
    (c) a second beam scattering means positioned in said tank;
    (d) a beam splitter positioned in said tank intermediate said probe and said first and second beam scattering means, said beam splitter being oriented at a predetermined angle relative to said probe and to respective ones of said first and second beam scattering means for splitting and directing a beam generated by said probe so that said beam is reflected off both of said first and second beam scattering means at an identical angle, whereby reflected portions of said beam reflected off of said first and second beam scattering means may be monitored.

2. The apparatus of claim 1, further comprising a first attenuator for attenuating said beam at said probe, a second attenuator for attenuating said beam at said first beam scattering means and a third attenuator for attenuating said beam at said second beam scattering means, whereby proportional amplitudes of said reflected portions of said beam may be independently varied.

3. The apparatus of claim 1, wherein said first beam scattering means comprises a movable belt mounted on a plurality of pulleys, said belt providing a clutter component of said reflected portions of said beam.

4. The apparatus of claim 3, further comprising means for controlling movement of said belt in either direction over said plurality of pulleys.

5. The apparatus of claim 4, wherein said means for controlling movement is a microstepping motor for driving said belt at a range of velocities from $-100$ cm/s to $+100$ cm/s.

6. The apparatus of claim 4 wherein said movable belt is a rubber belt having a layer of open cell foam thereon.

7. The apparatus of claim 6 wherein said layer of open cell foam is approximately 2 cm thick is characterized by a fibre diameter of approximately 0.002 cm and a cell size of approximately 0.05 cm.

8. The apparatus of claim 3 wherein said movable belt is a rubber belt having a layer of open cell foam thereon.

9. The apparatus of claim 8 wherein said layer of open cell foam is approximately 2 cm thick and is characterized by a fibre diameter of approximately 0.002 cm and a cell size of approximately 0.05 cm.

10. The apparatus of claim 1, wherein said second beam scattering means comprises a simulated vessel through which fluid is caused to flow, said vessel providing a flow component of said reflected portions of said beam.

11. The apparatus of claim 1, wherein said second beam scattering means comprises a movable belt mounted on a plurality of pulleys, said belt providing a flow component of said reflected portions of said beam.

12. The apparatus of claim 11, further comprising means for controlling movement of said belt in either direction over said plurality of pulleys.

13. The apparatus of claim 12, wherein said means for controlling movement is a microstepping motor for driving said belt at a range of velocities from $-100$ cm/s to $+100$ cm/s.

14. The apparatus of claim 1, wherein said beam splitter further comprises a layer of heat-shrink plastic mounted on a rigid frame.

15. The apparatus of claim 14, wherein said layer of heat-shrink plastic is approximately 0.001 cm thick.

16. A method of generating beams for calibrating a clinical Doppler ultrasound instrument having a probe generating an acoustic beam, said method comprising the steps of:
    (a) immersing said probe in a water-filled tank containing a pair of sound scattering belts and an acoustic beam splitter intermediate said probe and said belts for splitting and directing an acoustic beam generated by said probe so as to be reflected off of both of said signal scattering belts; and
    (b) independently attenuating said acoustic beam at said probe and at each of said pair of sound scattering belts for isolating portions of said acoustic beam at said probe and at respective ones of said sound scattering belts.

* * * * *